United States Patent [19]

Grimes

[11] Patent Number: 5,035,190

[45] Date of Patent: Jul. 30, 1991

[54] IMPLEMENT FOR SEEDING GRASS

[76] Inventor: Charles I. Grimes, Rt. 1, Box 56, Hennessey, Okla. 73742

[21] Appl. No.: 438,519

[22] Filed: Nov. 17, 1989

[51] Int. Cl.⁵ .......................... A01C 5/06; A01C 7/12; A01C 7/18; A01B 29/00
[52] U.S. Cl. ..................................... 111/195; 111/130; 111/177; 111/184; 366/195; 222/238; 301/1; 301/36 R; 172/519
[58] Field of Search ................... 111/130, 77, 78, 173, 111/177, 133, 184, 13, 191, 194, 195, 196, 901, 902, 925; 366/194, 195, 196, 325; 301/1, 5 R, 13 R, 128, 36 R; 152/375, 376, 220; 172/519, 538; 222/238, 330

[56] References Cited

U.S. PATENT DOCUMENTS

| | | | |
|---|---|---|---|
| 20,357 | 5/1858 | McCammon | 366/195 X |
| 198,778 | 1/1878 | Reynolds | 111/130 |
| 350,914 | 10/1886 | Corbin | 111/130 |
| 483,655 | 10/1892 | Lang | 366/196 |
| 544,966 | 8/1895 | Davis | 222/238 |
| 617,821 | 1/1899 | Street | 222/238 |
| 848,306 | 3/1907 | Hull | 111/191 X |
| 1,136,892 | 4/1915 | Copithorn | 301/13 R |
| 1,319,570 | 10/1919 | Dempsey | 152/376 X |
| 1,426,671 | 8/1922 | Printz | 222/238 |
| 1,894,008 | 1/1933 | Segars | 222/238 X |
| 2,684,785 | 7/1954 | Waldorf et al. | 222/238 X |
| 2,876,013 | 3/1959 | Neff | 111/130 X |
| 3,128,921 | 4/1964 | Henderson | 111/78 X |
| 3,570,569 | 3/1971 | Hartley | 366/196 X |
| 4,030,428 | 6/1977 | Trua | 111/177 X |
| 4,155,315 | 5/1979 | Dobbins | 111/901 X |
| 4,909,663 | 3/1990 | Freeman | 152/376 X |

FOREIGN PATENT DOCUMENTS

| | | | |
|---|---|---|---|
| 3539821 | 5/1987 | Fed. Rep. of Germany | 172/519 |
| 5871 | 8/1903 | German Democratic Rep. | 222/238 |
| 24683 | 5/1908 | Sweden | 111/130 |
| 613996 | 12/1948 | United Kingdom | 301/128 |
| 739871 | 11/1955 | United Kingdom | 172/519 |

Primary Examiner—Danton D. De Mille
Attorney, Agent, or Firm—Bill D. McCarthy; Glen M. Burdick

[57] ABSTRACT

An implement for seeding "fluffy" grass seed comprising a seed box defining a plurality of seed compartments having a seed dispensing slot in a lower portion thereof. Seed delivery tubes are connected to the seed box so that each of the seed delivery tubes encompasses one of the seed dispensing slots. A picker wheel assembly is rotatably supported on the seed box such that a picker wheel is disposed in each of the seed dispensing slots and a directional flow agitator assembly is rotatably mounted in each of the seed compartments for agitating and directing seed toward the seed dispensing slots and into contact with the picker wheels. A packer assembly, designed to substantially "float" over the surface of the ground, is rotatably connected to the frame assembly so as to support the frame assembly while at the same time firming soil over and around seed dispensed from the seed compartments through the seed delivery tubes. The packer assembly, which is disposed rearward of the seed delivery tube, is provided with a substantially resilient ground engaging portion so as to provide the packer assembly, and thus the implement, with a "floating-type" motion as the packer assembly firms the soil over and around the seeds and thereby assures that the seeds are substantially uniformly planted to a desired depth.

11 Claims, 5 Drawing Sheets

IMPLEMENT FOR SEEDING GRASS

BACKGROUND OF THE INVENTION

1. Field of the Invention

The present invention relates generally to the field of implements for seeding grass, and more particularly, but not by way of limitation, to an implement for seeding fluffy-type grass seed.

2. Brief Description of the Prior Art

Many farms have an abandoned acreage which is not now being cultivated because of its low production when planted to cultivated crops. This land is not returning to the owner enough profit to pay taxes; and other lands now being cultivated yield so little that the land should be removed from cultivation and returned to pasture. In addition, throughout the country certain rang lands have become infested with undesirable "brush" species, such as mesquite, which decreases the range land productivity, as well as hampering the handling of livestock.

In attempts to make the land more productive, farmers and ranchers have attempted to establish native grasses on such lands. The principal problem in establishing native grasses is to get the seed planted.

That is, for proper germination and fast emergence, the native grasses must be planted to a depth of from zero to one-half inch, and the grass seed must be packed to ensure that moist soil is firmed over and around the grass seed and to ensure that air pockets around the seed are eliminated. Further, because of the "fluffy" nature of native grass seeds, it is often difficult to establish a uniform stand of the grass when using conventional drills or the prior art grass seeders.

Many of the prior art seeders and drills utilize hard press wheels which have a tendency to bury the seed at a depth which hinders germination; while other prior art grass seeding implements employ draw bar-type mechanisms which do not adequately pack the seed in the seed bed and which have a tendency to produce a bouncing movement as the implement is moved across the seed bed. In addition to the above, other of the prior art grass seeders or drills have employed discs to either open furrows for the seeds or to cover the dispensed seeds in the seed bed. Such discs are not only expensive to maintain, but have a tendency to bounce or jolt the implement when rocks and other foreign objects are encountered, and to plant grass seed too deep.

Farmers and ranchers have long recognized the importance of returning unproductive land to pastures of native grasses. However, problems have nevertheless been encountered in that because of the "fluffy" nature of native grass seeds, and varieties of the Old World Bluestems, the seed boxes of the prior art devices often become clogged, the seed dispensing rate is difficult to regulate, and the depth to which the seed is planted is difficult to control. Thus, new and improved implements for seeding native grasses are constantly being sought which can be employed over a wide variety of terrain, which will firm up seed beds such that the seed is planted to a controlled depth of from zero to one-half inch, which are easy to calibrate, and which are substantially clog free so that the grass seed is substantially uniformly dispersed from the implement. It is to such an implement for seeding grass that the present invention is directed.

SUMMARY OF THE INVENTION

According to the present invention an improved grass seeding apparatus adapted for planting "fluffy" native grass seeds over a variety of terrains is provided wherein the seed dispensed therefrom can be planted at a controllable depth of from zero to one-half inch so as to enhance seed germination and fast emergence. Broadly, the implement for seeding grass of the present invention includes a seed box supported on a frame assembly, the seed box defining a plurality of seed compartments having a seed dispensing slot in a lower portion thereof, and seed delivery tubes connected to the seed box so that each of the seed delivery tubes encompasses one of the seed dispensing slots. A picker wheel assembly is rotatably supported on the seed box such that a picker wheel is disposed in each of the seed dispensing slots and a directional flow agitator assembly is rotatably mounted in each of the seed compartments for agitating and directing seed toward the seed dispensing slots and into contact with the picker wheels.

A packer assembly, designed to substantially "float" over the surface of the ground, is rotatably connected to the frame assembly so as to support the frame assembly while at the same time firming soil over seed dispensed from the seed compartments through the seed delivery tubes. The packer assembly, which is disposed rearward of the seed delivery tube, is provided with a substantially resilient ground engaging portion so as to provide the packer assembly, and thus the implement, with a "floating-type" motion as the packer assembly firms the soil over the seeds and thereby assures that the seeds are substantially uniformly planted to a desired depth of from zero to one-half inch regardless of minor variations in soil elevation or foreign objects, such as rocks, small stumps and the like in the seed bed.

The implement, which is connected to a towing vehicle at a forwardly extending end portion of the frame assembly, is also provided with a drive mechanism for operably connecting the packer assembly to the directional flow agitator assembly and to the picker wheel assembly. Thus, when the packer assembly is rotated due to movement of the implement across the seed bed rotational movement is imparted to the directional flow agitator assembly and to the picker wheel assembly, and seed is uniformly directed from the seed box compartments into the seed delivery tubes for planting in the ground.

The directional flow agitator assembly, which prevents bridging of grass seed in the seed compartments of the seed box, while at the same time directing the seed toward the slot and thus the picker wheel disposed therein, comprises a plurality of spatially disposed, substantially V-shaped agitators supported on an agitator shaft. The agitator shaft is rotatably journaled in opposed end walls of the seed box. Each of the V-shaped agitator, which extends radially from the agitator shaft, is skewed relative to the elongated axis of the agitator shaft so that a plane formed by each of the V-shaped agitators intersects the elongated axis of the agitator shaft at an acute angle.

A plurality of the V-shaped agitators are disposed along the agitator shaft such that four of the V-shaped agitators are disposed in each of the seed compartments of the seed box. That is, two inner disposed V-shaped agitators and two outer disposed V-shaped agitators extend radially from the agitator shaft such that the four agitators are disposed within each seed compartment.

The two inner disposed agitators extend from the agitator shaft in opposite directions such that planes formed by leg components of each of the inner disposed agitators are parallel and in a spatial relationship; while the two outer disposed agitators extend from the agitator shaft in opposite directions and plane formed by leg components of each of the outer disposed agitators are parallel and in spatial relationship.

The packer assembly, which supports the implement as well as firms the soil over seed dispensed from the seed box, comprises a packer axle rotatably connected to the frame, a cylindrically shaped packer casing supported on the packer axle, and a plurality of tires disposed on the packer casing, each of the tires having a hollow, non-inflated interior portion. The cylindrically shaped packer casing is connected to the packer axle such that the packer axle and the packer casing have a common elongated central axis. A plurality of spatially disposed rod members are secured to the outer surface of the packer casing for stabilizing the tires thereon and for preventing slippage of the tires relative to the packer casing as the packer casing and tires are rotated due to movement of the implement along the ground. Tire stabilization members are positionable on each end portion of the packer casing and engage the ends of the spatially disposed rods such that the tire stabilization members abuttingly engage a side wall of the outer most tires.

An object of the present invention is to provide an implement for seeding "fluffy" grass seeds wherein the depth to which the seeds are planted ca be easily controlled.

Another object of the present invention, while achieving the before stated object, is to provide an improved implement for seeding grass wherein the seed can be firmly packed in the soil so as to eliminate air pockets in the soil and thereby enhance seed germination and emergence.

Another object of the present invention, while achieving the before stated objects, is to provide an improved implement for seeding grass wherein fluffy-type seed can be planted to a uniform predetermined depth in the presence of irregularities in the terrain or foreign objects disposed therein, such as small rocks, stumps and the like.

Yet another object of the present invention, while achieving the before stated objects, is to provide an improved implement for seeding "fluffy" native grasses wherein bridging of the seed in the seed box is substantially eliminated so that the seed is uniformly dispensed therefrom for planting.

Still another object of the present invention, while achieving each of the before stated objects is to provide an improved grass seeder which is substantially clog-free when planting processed or unprocessed seed.

Another object of the present invention, while achieving each of the before stated objects, is to provide an improved implement for seeding grass which can be easily calibrated.

Yet another object of the present invention, while achieving each of the before stated objects, is to provide an improved grass seeder which is economical to manufacture, is substantially maintenance free, is durable in construction, and which overcome the defects of the prior art implements employed for planting grass seed.

Other objects, features and advantages of the present invention will become apparent from the following detailed description when read in conjunction with the drawings and appended claims.

DETAILED DESCRIPTION

Figure 1:
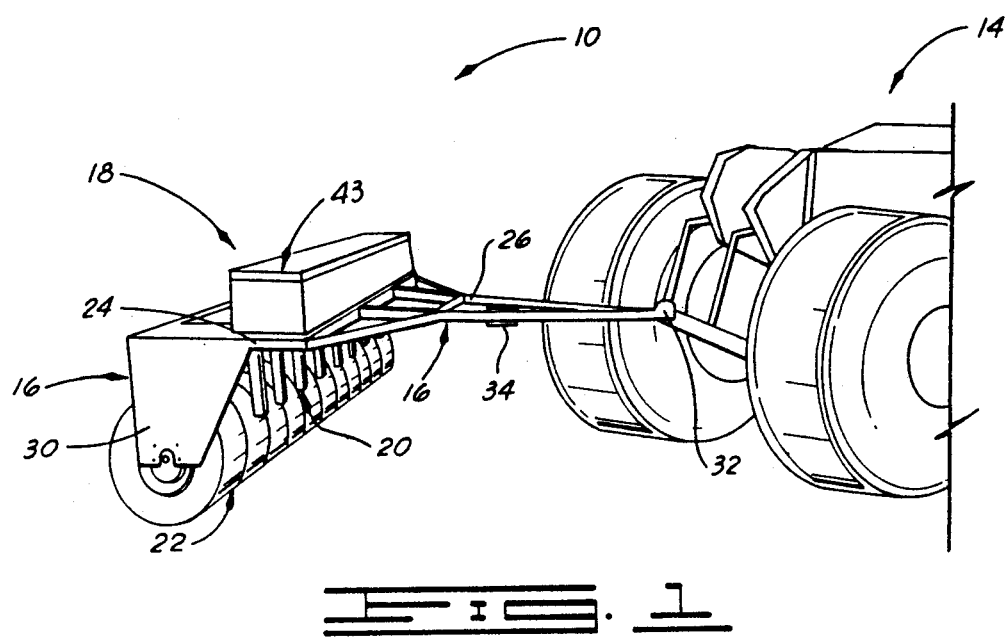
FIG. 1 is a pictorial representation of a grass seeding implement of the present invention connected to a conventional tractor.

Referring now to the drawings, and more particularly to FIG. 1, an implement 10 of the present invention is shown for seeding grass connected to a tractor 14 such that the implement 10 can be pulled across a field (not shown) to be planted with grass seed. The crust of the field is desirably broken prior to using the implement 10 so that grass seed discharged from the implement 10 can be firmly packed to a depth of from zero to one-half inch to enhance seed germination and fast emergence. As will be more clearly set forth hereinafter, the unique design and construction of the implement permits one to dispense a large variety of "fluffy" grass seed such as the Old World Bluestems, namely, Caucasian Bluestem, Plains Bluestem, W. W. Spar Bluestem, and Native Grass such as Big Bluestem, Little Bluestem and Indian Grass. Further, when employing the implement 10 to seed such "fluffy" grass seeds, bridging of the grass seed in the implement is substantially eliminated, thereby enhancing a more uniform seeding of the field.

The implement 10 comprises a frame assembly 16, a seed box 18, a plurality of seed delivery tubes 20 and a packer assembly 22. The frame assembly 16 is desirably fabricated o a plurality of tubular members so as to have a substantially rectangular shaped rearward portion 24 and a forward tongue portion 26. The rearward portion 24 is provided with substantially parallel, spatially disposed, downwardly extending axle support members 28 and 30 (see FIGS. 1 and 8) so that the packer assembly 22 can be rotatably connected to the axle support members 28 and 30. Thus, the packer assembly 22, in addition to firming the soil over and around seeds dispensed through the seed delivery tubes 20, also functions to support the frame assembly 16 as shown.

The forward tongue portion 26 of the frame assembly 16 is provided with a hitch 32 so that the implement 10 can be connected to the tractor 14 or any other suitable towing vehicle, such as a pickup truck, in a customary manner.

The seed box 18, which supports the plurality of seed delivery tubes 20 such that seed can be dispensed from the seed box 18 via the seed delivery tubes 20, is supported by the rearward portion 24 of the frame assembly 16 such that the seed delivery tubes 20 are disposed forwardly of and in close proximity to the packer assembly 22 substantially a shown. Thus, seed dispensed from the seed box 18 onto the ground by the seed delivery tubes 20 will be immediately firmed and packed to the desired depth by the packer assembly 22.

To stabilize the implement 10 when same is in a stored position, the frame assembly 16 further comprises a jack 34 supported on the forward tongue portion 26. The jack 34 is selectively movable between a stored position (as shown in FIG. 1) and an extended position (not shown) wherein the jack 34 is moved so as to be substantially vertically disposed and engage the surface of the ground so that the frame assembly 16 is maintained in a substantially horizontal position. The use of jacks, such as jack 34, to stabilize implements is well known, as well as is their pivotal attachment to frame assemblies for movement between the stored position and the extended position. Thus, no further comments concerning the jack 34 are believed necessary to enable one to fully understand the implement 10 of the present invention.

Figure 2:
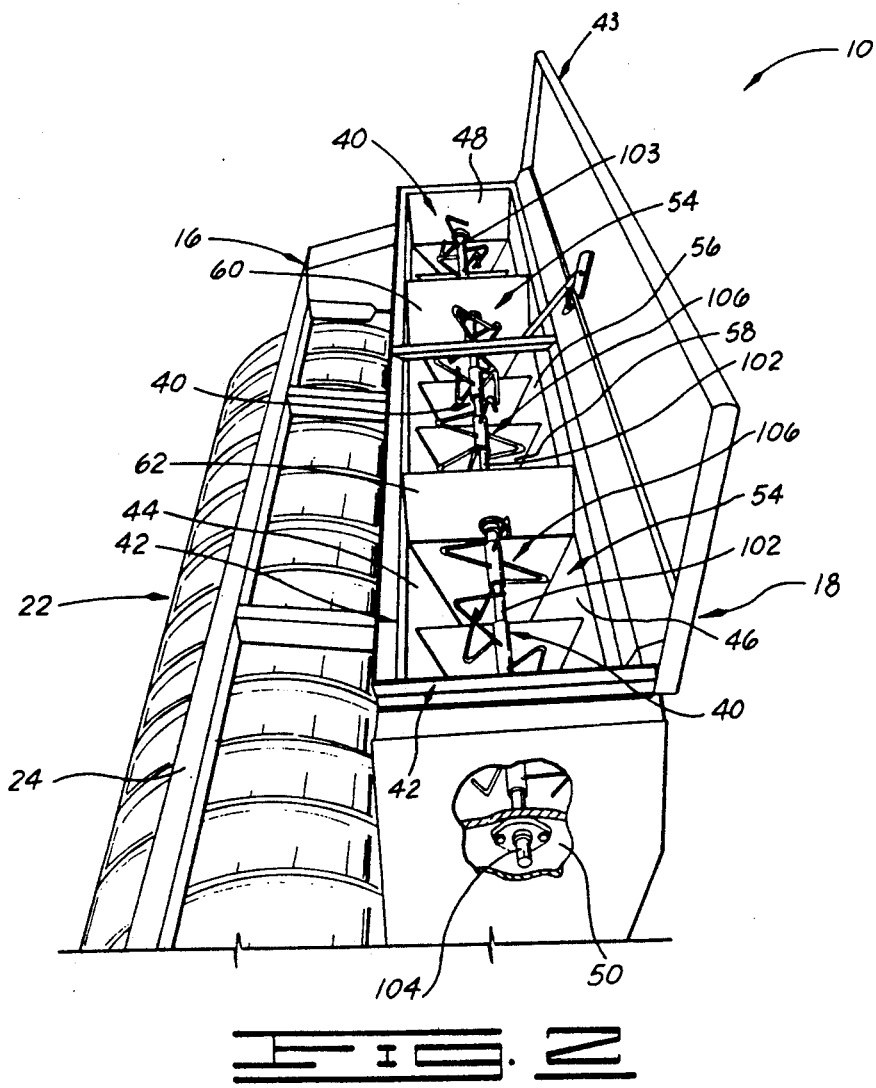
FIG. 2 is a partially broken, cutaway perspective view of the grass seeding implement of FIG. 1 wherein a closure member for a seed box is in a raised position.
Figure 3:
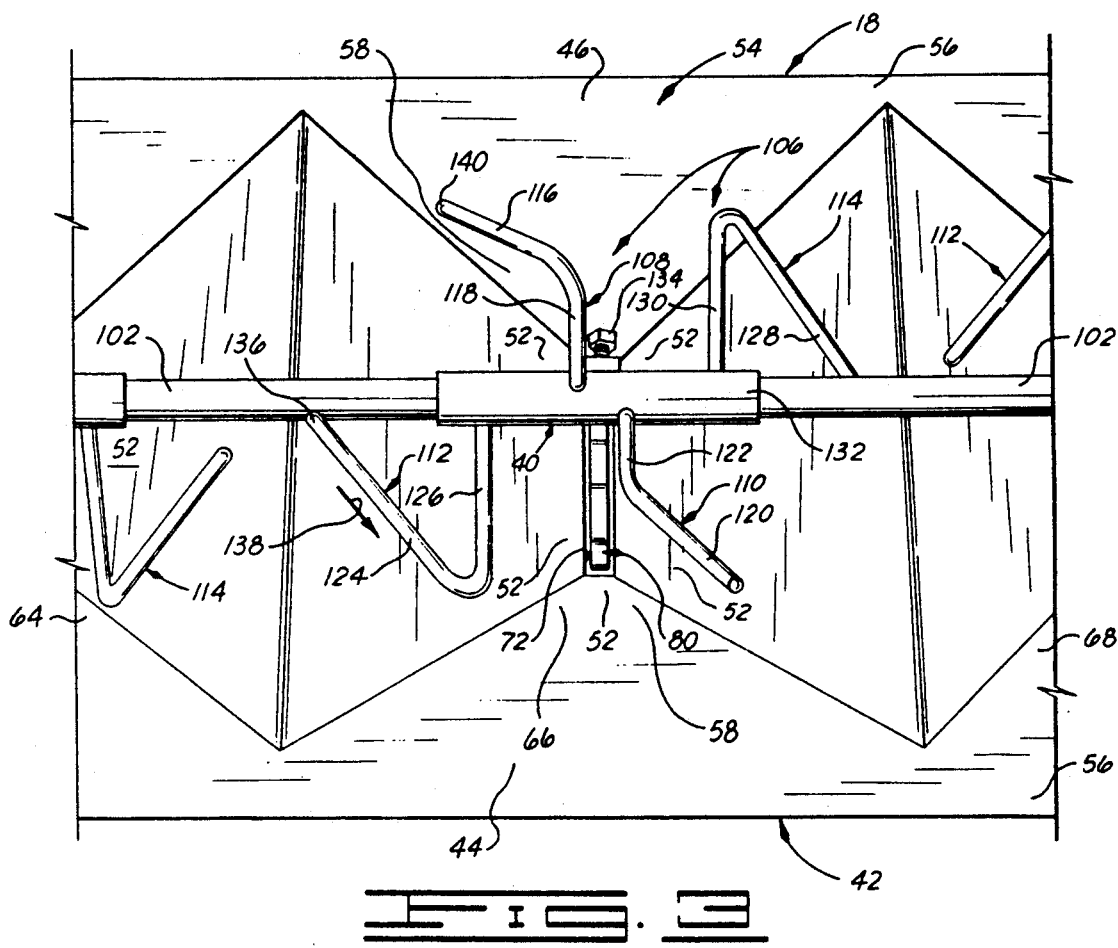
FIG. 3 is a fragmental top plan view of a portion of the seed box of the grass seeding implement illustrating a directional flow agitator assembly in combination with a picker wheel for selectively discharging seed from the seed compartments of the seed box.

Referring now to FIGS. 2 and 3, the seed box 18 is illustrated in combination with a directional flow agitator assembly 40. The seed box 18 is provided with an elongated body 42 having a cover member 43 pivotally connected to the body 42 such that the cover member 43 is pivotably movable between a raised position (see FIGS. 2 and 8) and a lowered or closed position (see FIG. 1). In the raised position seed can be placed in the body 42; whereas in the lower position the cover member 43 closes off the body 42.

The body 42 of the seed box 18 is provided with a first side wall 44, an opposed second side wall 46, a first end wall 48, and an opposed second end wall 50. The first and second side walls 44, 46, and the first and second end walls 48, 50 are interconnected so as to define a seed compartment 54 having an upper portion 56 and a lower portion 58. If desired, the seed compartment 54 can be sectionalized by securing divider plates 60 and 62 within the upper portion 56 substantially as shown.

Figure 4:
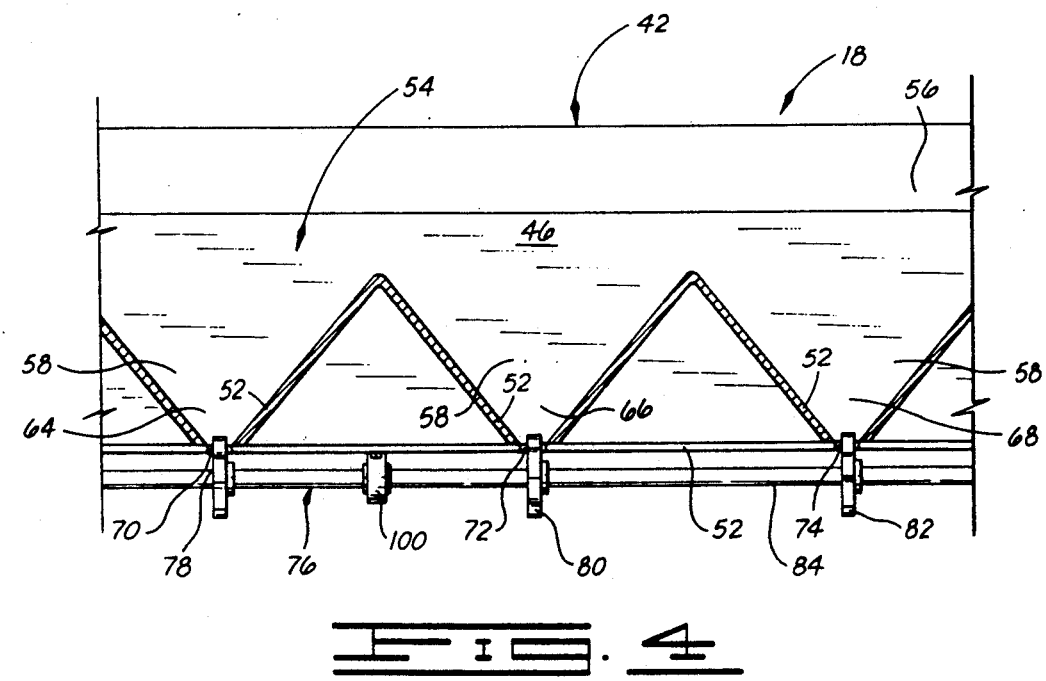
FIG. 4 is a partially cutaway, fragmental side elevational view of the seed box showing the relationship between the seed compartments of the seed box and a picker wheel assembly.

The lower portion 58 of the seed compartment 54 is provided with a plurality of seed subcompartments, three of such subcompartments 64, 66 and 68 being illustrated in FIGS. 3 and 4. Each of the seed subcompartments is identical in construction and has an inverted frusto-pyramidal configuration substantially as shown. The subcompartments, such as the subcompartments 64, 66 and 68, comprise a bottom wall 52 of the seed compartment 54. However, it should be understood that in certain applications the bottom wall 52 of the seed compartment 54 could comprise a substantially horizontally disposed member extending between the first and second side walls 44, 46 and the first and second end walls 48, 50.

Each of the seed subcompartments is provided with an elongated seed dispensing slot extensive therethrough in a lowermost portion thereof, such as seed dispensing slots 70, 72 and 74. Each of the seed dispensing slots 70, 72 and 74 is adapted to receive a picker wheel of a picker wheel assembly 76, such as picker wheels 78, 80 and 82, so that upon activation of the picker wheel assembly 76 grass seed can be controllably discharged from the seed compartment 58 via the seed subcompartments 64, 66 and 68, the slots 70, 72 and 74 and the picker wheels 78, 80 and 82. It should be noted that the seed dispensing slots (such as the seed dispensing slots 70, 72 and 74) and the picker wheels (such as the picker wheels 78, 80 and 82) are sized such that when a picker wheel is positioned within each of the seed dispensing slots discharge of grass seed from the seed subcompartments 64, 66 and 68 is prevented by the picker wheels until such time that the picker wheel assembly 76 is activated. Thus, the design of the seed subcompartments, in combination with the design of the directional flow agitator assembly 40 and the picker wheel assembly 76 permits one to controllably discharge "fluffy" grass seed from the seed compartment 54 via the seed dispensing slots. In addition, the complimentary sweeping action obtained by the rotation of the directional flow agitator assembly 40, in combination with the inverted frustopyramidal configuration of the seed subcompartments, substantially eliminates bridging of grass seed within the seed compartment 54 which enhances a controlled, uniform delivery of "fluffy" grass seed from the seed compartment 54.

Figure 5:
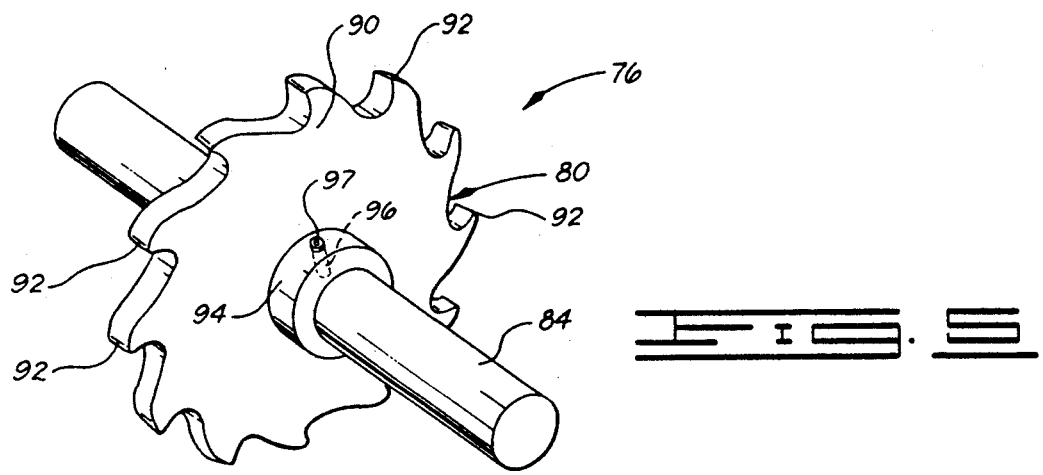
FIG. 5 is a perspective view of a picker wheel supported on a portion of a picker wheel axle of the picker wheel assembly.

Referring now to FIGS. 3-5, the picker wheel assembly 76 and its relationship to the seed box 18 is illustrated. The picker wheel assembly 76 comprises a plurality of picker wheels, such as the picker wheels 78. 80 and 82, rotatable mounted on a picker wheel axle 84. The picker wheel axle 84 is characterized as having a first end portion 86 (see FIGS. 10 and 11) and an opposed second end portion 88 (see FIG. 8). The first end portion 86 is journally connected to the first end wall 48 of the seed box 18 and the second end portion 88 is journally connected to second end wall 50 of the seed box 18 such that the picker wheel axle 84 is disposed below and in a spatial relationship with the portions of the seed subcompartments, such as the subcompartments 64, 66 and 68, which constitute the bottom wall 52 of the seed box 18.

The number of picker wheels mounted on the picker wheel axle 84 corresponds to the number of seed dispensing slots formed in the seed box 18. Further, the picker wheels are mounted on the picker wheel axle 84 so that one of the picker wheels extends upwardly through each of the seed dispensing slots formed in the lowermost portion of each of the seed subcompartments, such as the picker wheels 78, 80 and 82 which extend upwardly through the seed dispensing slots 70, 72 and 74 in the subcompartments 64, 66 and 68 substantially as shown in FIG. 4. Thus, when rotational movement is imparted to picker wheel axle 84 the picker wheels, such as the picker wheels 78, 80 and 82, are rotated and seed in the seed subcompartments 64, 66 and 68 is removed from such seed subcompartments and delivered to the seed delivery tubes 20 via the seed dispensing slots 70, 72 and 74.

Each of the picker wheels of the picker wheel assembly 76 are substantially identical in construction. Thus, only picker wheel 80 will be described in detail. Referring now to FIG. 5, the picker wheel 80 comprises a disc shaped member 90 having a plurality of teeth 92. Each of the teeth 92 is formed by cuts which extend from the circumference of the disc shaped member 90 a predetermined distance along a chord. The disc shaped member 90, which is provided with a centrally disposed bore (not shown) extending therethrough, is also provided with a collar member 94 which is aligned with the bore in the disc shaped member 90 so a to permit the picker wheel 80 to be positioned on the picker wheel axle 84. The collar member 94 is provided with a threaded aperture 96 (shown in phantom) adapted to receive a set screw 97 so that the disc shaped member 90 can be secured in a stable position on the picker wheel axle 84.

As previously stated, the picker wheel axle 84 extends the length of the body 42 and the first end portion 86 of the picker wheel axle 84 is connected to a drive mechanism 98. To stabilize the picker wheel axle 84, and thus ensure that each of the picker wheels, such as the picker wheels 78, 80 and 82, are properly positioned within the slots formed in the seed subcompartments, such as the slots 70, 72 and 74 of the seed subcompartments 64, 66 and 68 (FIGS. 4 and 7), a plurality of pillow blocks 100 are secured to the body 42 of the seed box 18 (substantially as shown in FIGS. and 7) by any suitable means, such as with bolts. The number of pillow blocks 100 employed can vary depending upon the over all length of the body 42, and the length of the picker wheel axle 84.

Figure 6:
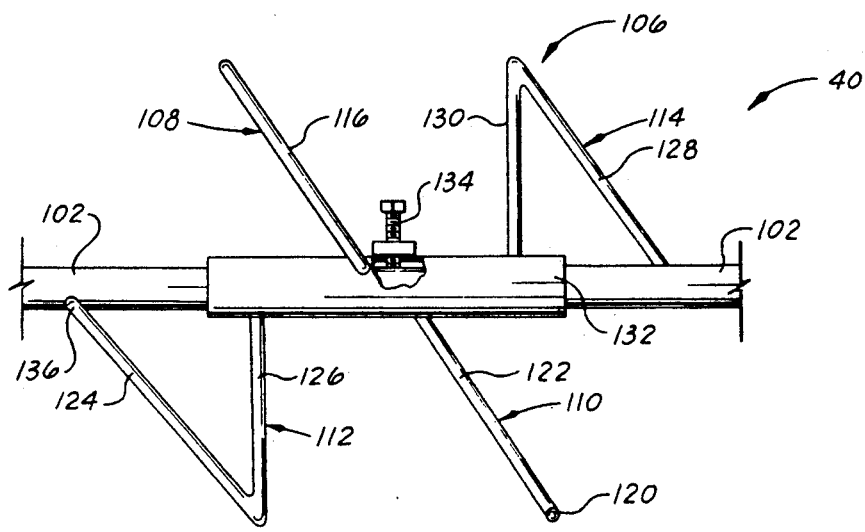
FIG. 6 is a perspective view of a plurality of substantially V-shaped agitators supported on a portion of an agitator shaft.

Referring now to FIGS. 2, 3 and 6, the directional flow agitator assembly 40 of the implement 10 is more clearly shown. The directional flow agitator assembly 40 comprises an agitator shaft 102 having a first end portion 103 and an opposed second end portion 104, and a plurality of sets of substantially V-shaped agitators 106 supported on the agitator shaft 102 so that each set of the agitators 106 extend radially therefrom. The first end portion 103 of the agitator shaft 102 is journaled in the first end wall 48 of the seed box 18 such that the first end portion 103 extends outwardly thereform for connection to the drive mechanism 98; and the opposed second end portion 104 is journally connected to the opposed second end wall 50 of the seed box 18. In order to stabilize the agitator shaft 102 along the lengths of the body 42, the agitator shaft 102 is desirably journally connected to the divider plates 60 and 62 of the seed compartment 54 substantially as shown.

Each set of V-shaped agitators 106 are identical in construction and each set comprise two inner disposed Vshaped agitators 108, 110 and two outer disposed V-shaped agitators 112, 114. Each of the inner disposed agitators 108, 110 and the outer disposed agitators 112, 114 radially extend from the agitator shaft 102 such that each set of agitators 106 is adapted for rotational movement within one of the seed subcompartments, such as the seed subcompartment 66 shown in FIG. 3. Further, each of the inner disposed agitators 108, 110 and the outer disposed agitators 112, 114 are disposed in a skewed position relative to the elongated axis of the agitator shaft 102 so that a plane formed by each of the agitators 108-114 intersects the elongated axis of the agitator shaft 102 at an acute angle.

In order to obtain the desired directional agitation of "fluffy" seed and to prevent bridging of seed within the seed subcompartments, as well as to direct the seed over the picker wheel positioned in the slot formed in a lowermost portion of each of such seed subcompartments (such as the picker wheel 80 disposed in the slot 72 of the seed subcompartment 66), the two inner disposed agitators 108 and 110 of each set of the V-shaped agitators 106 extend from the agitator shaft 102 such that planes formed by leg components 116, 118 of the inner disposed agitator 108 and leg components 120, 122 of the inner disposed agitator 110 are parallel and in a spatial relationship. Similarly, the two outer disposed agitators 112, 114 extend from the agitator shaft 102 such that planes formed by leg components 124, 126 of the outer disposed agitator 112 and leg components 128, 130 of the outer disposed agitator 114 are parallel and in a spatial relationship. Thus, the leg components 118 and 122 of the inner disposed agitators 08, 110 are substantially normaly disposed to the leg components 126, 130 of the outer disposed agitators 112, 114 substantially as shown in FIGS. 3 and 6.

To enhance and facilitate alignment of each set of the agitators 106 in their desired position relative to the seed subcompartments, the inner disposed agitators 108, 110 and the outer disposed agitators 112, 114 of each set of the agitators 106 are secured to a collar member 132 which is positionable on the agitator shaft 102. The collar member 132 is provided with a threaded bore (not shown) adapted to receive a set screw 134 so that the collar member 132, and thus each set of agitators 106, can be secured in a stable position on the agitator shaft 102 substantially as shown in FIG. 3. It should be noted that the configuration of the leg components forming each of the sets of agitators 106, and the positioning of the inner and outer disposed V-shaped agitators 110-114 relative to one another, provides an improved means for agitating seed within the seed subcompartments of the seed compartment 54 of the implement 10, and also provides a unique mechanism for directing seed toward the slot of each of the seed subcompartments and into contact with the picker wheel disposed therein. For example, the outer disposed V-shaped agitator 112 compliments the inner disposed V-shaped agitator 108 in directing seed toward the slot 72 and the picker wheel 80. Similarly, the outer disposed V-shaped agitator 114 compliments the inner disposed V-shaped agitator 110 in directing seed toward the slot 72 and the picker wheel 80. That is, when the agitators 106 are caused to rotate, a distal end 136 of the outer disposed agitator 112, engages and lifts the seed in the seed subcompartment. Continued rotation of the agitator shaft 102 causes the seed to travel along the axis of the leg component 124 in the direction indicated by the arrow 138. The seed is then engaged by a distal end 140 of the inner disposed agitator 108 and caused to travel along the axis of the leg component 116 towards the slot 72 and the picker wheel 80. It should be understood that the outer and inner disposed agitators 114 and 110 function in a similar manner so that the seed is constantly being directed toward the slot 72 and the picker wheel 80. Further, the agitation created by rotation of the agitator shaft 102 and each of the agitators constituting the set of agitators 106 substantially eliminates bridging of the "fluffy" grass seed within the seed subcompartments of the seed box 18.

Figure 7:
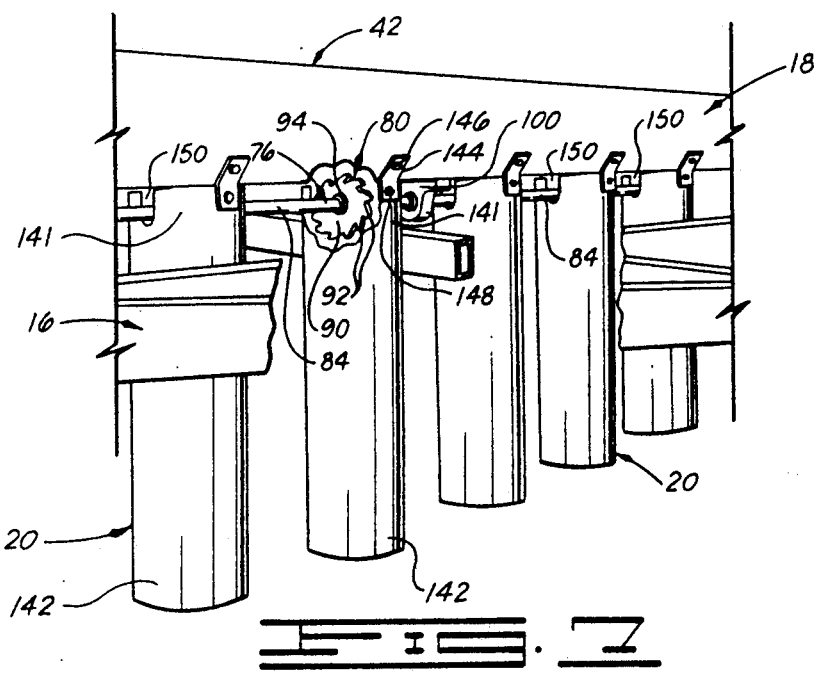
FIG. 7 is a fragmental, partially cutaway perspective view of the grass seeding implement of FIG. 1 showing a plurality of seed delivery tubes supported by the seed box.
Figure 8:
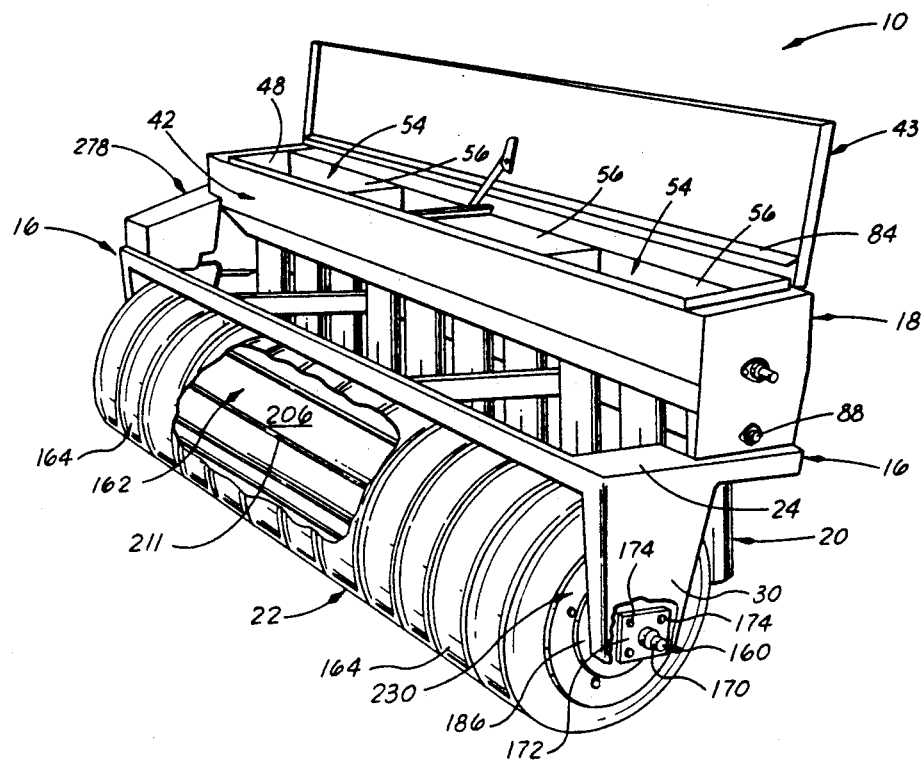
FIG. 8 is partially cutaway, pictorial representation of the packer assembly of the grass seeder of FIG. 1.

Referring now to FIGS. 1, 7 and 8, the seed delivery tubes 20 of the implement 10 are illustrated in more detail. The seed delivery tubes 20 are identical in construction, and thus only one of the seed delivery tubes 20 will be described in detail. However, it should be noted that the number of seed delivery tubes 20 employed on the implement 10 correspond to the number of picker wheels and thus the number of slots formed in the subcompartments of the seed box 18.

The seed delivery tubes 20 are an elongated tubular members having an upper end 141, an opposed lower end 142, and an inside diameter greater than the diameter of the picker wheel and the length of the slot, such as the picker wheel 80 and the slot 72, into which the picker wheel extends. The upper end 141 of each of the seed delivery tubes 20 is secured to the body 42 by any suitable means, such as by a bracket 144 and a plurality of bolts 146, 148. The upper end 141 of each of the seed delivery tubes 20 is provided with aligned recesses on opposed sides thereof, such as recesses 150, so that when the upper ends 141 of the seed delivery tubes 20 are secured to the body 42 of the seed box 18, the picker wheel axle 84 extends through the aligned recesses 150.

As previously stated the seed delivery tubes 20 are provided with an inside diameter greater than the diameter of the picker wheel and the length of the slot into which the picker wheel extends. Thus, when the upper ends 141 of the seed delivery tubes 20 are secured to the seed box 18, the upper ends 141 of the seed delivery tubes 20 encompass the portions of the picker wheels disposed below the bottom wall 52, and at the same time encompasses the slots such that seed discharged from the seed box 18 via the picker wheels and the slots is directed into the seed delivery tubes 20.

The seed delivery tubes 20 extends from the seed box 18 such that the elongated axis of the seed delivery tubes 20 are substantially vertically disposed. The lower end 142 of the seed delivery tubes 20 are disposed in close proximity to and forward the packer assembly 22 so that seed discharged from the seed box via the rotational movement of the picker wheels and the slots gravitationally falls through the seed delivery tubes 20 to the ground for subsequent packing by the packer assembly 22.

The packer assembly 22 functions not only to pack and to firm the soil around seeds discharged from the seed box 18 via the seed delivery tubes 20, but also provides the wheel means for the implement 10 and a ground drive for the drive mechanism 98 which imparts rotational movement to the directional flow agitator assembly 40 and the picker wheel assembly 76. As shown in FIG. 1 and 8, the packer assembly 22 is rotatably connected to the axle support members 28 and 30 of the frame assembly 16. Thus, the packer assembly 22 not only supports the implement 10, but also imparts rotational movement for firming soil over and around seeds dispensed from the seed box 18, as well as imparting rotational drive for the drive mechanism 98 which activates the directional flow agitator assembly 40 and the picker wheel assembly 76.

Figure 9:
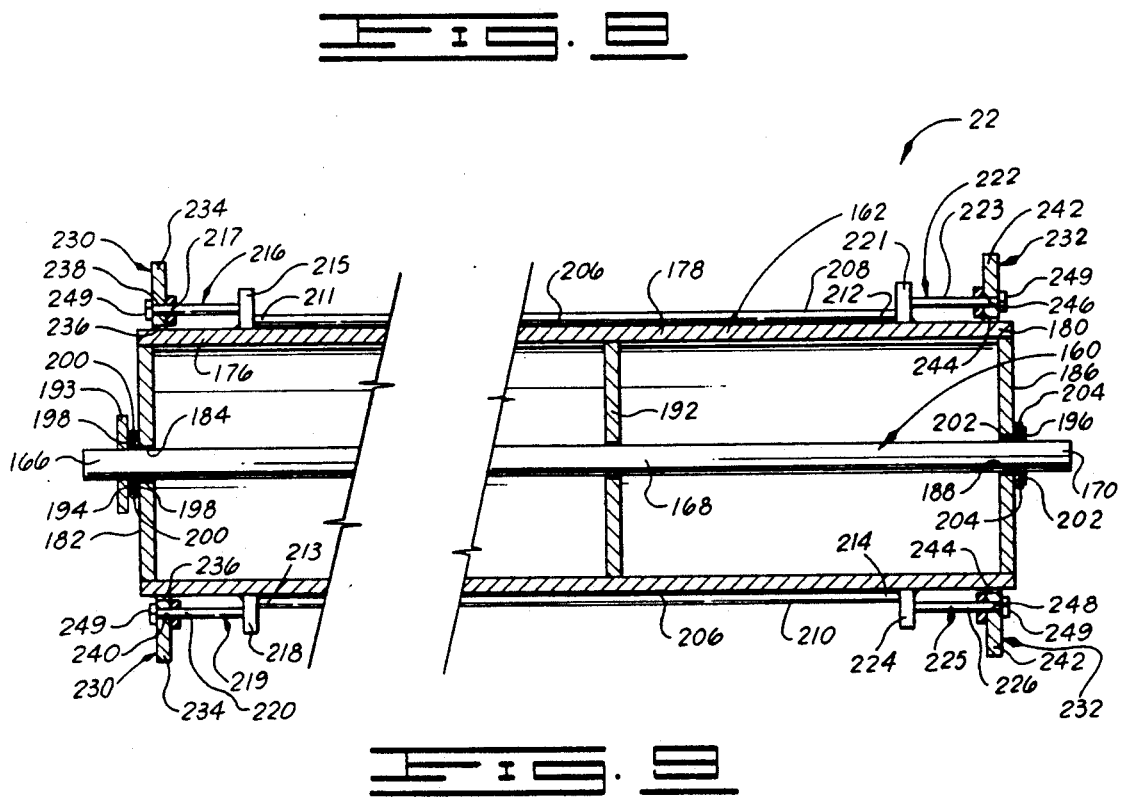
FIG. 9 is a fragmental cross-sectional view of the packer assembly of FIG. 8 wherein the tires have been removed therefrom.

Referring now to FIGS. 8 and 9, the packer assembly 22 comprises a packer axle 160, a substantially cylindrically shaped packer casing 162 supported on the packer axle 160, and a plurality of tires 164 supported on the packer casing 162. The tires 164 are conventional pneumatic tires having a hollow, non-inflated interior portion. Thus, the tires, in cooperation with the packer casing 162, provide the packer assembly 22 with a cushioned ride which assists in firming the soil over the seeds, but yet permits one to maintain uniform contact with the surface of the ground even when encountering small rocks, stumps, and the like.

The packer axle 160 is characterized as having a first end portion 166, a medial portion 168 and an opposed second end portion 170. The second end portion 170 is rotatably connected to the axle support member 30 via a flange bearing 172 which is connected to the axle support member 30 via a plurality of bolts 174. Similarly, the first end portion 166 of the packer axle 160 is rotatably connected to the axle support member 28 via a flange bearing (not shown) in a similar manner. As will be understood, the packer axle 160 is rotatably connected to the axle support members 28 and 30 so that the packer axle 160 is disposed in a substantially perpendicular, spatial relationship with the seed delivery tubes 20. That is, the packer axle 160 is substantially horizontally disposed, the seed delivery tubes 20 are substantially vertically disposed and the packer axle 160 is offset relative to the seed delivery tubes 20 a sufficient distance so that when the packer casing 162 and the tires 164 are disposed on the packer axle 160, the tires 164 are disposed in close proximity to and rearward of the seed delivery tubes 20.

Referring now to FIG. 9, the packer casing 162 in relationship with the packer axle 160 is illustrated. The packer casing 162, a hollow elongated tubular member, is characterized as having a first end 176, a medial portion 178 and an opposed second end 180. A first end cap member 182 having an axle receiving bore 184 extending therethrough is connected to the first end 176 by any suitable means, such as welding. Similarly, a second end cap member 186 having an axle receiving bore 188 extending therethrough is secured to the opposed second end 180 of the packer casing 162 by any suitable means, such as welding. It should be noted that the packer casing 162 has a length less than the length of the packer axle 160 so that when the packer axle 160 is rotatably connected to the axle support members 28, 30 as heretofore described, the rotational movement of the packer casing 162 is not impeded by the axle support members 28 and 30.

To maintain the integrity of the packer casing 162 relative to the packer axle 160, and to eliminate any "whipping" motion which could occur as the packer assembly 22 is moved along the surface of the ground, a centrally disposed reinforcing disc 192 is disposed about the medial portion 168 of the packer axle 160 and secured to the medial portion 178 of the packer casing 162 by any suitable means such as welding. It should be noted that the reinforcing disc 192 is no secured to the packer axle 160 so as to eliminate stress which could be created on the packer axle 160 by such connection.

To secure the packer casing 162 on the packer axle 160, a drive sprocket 193 of the drive mechanism 98 is provided with a lock collar 194 and the second end cap member 186 is provided with a lock collar 196. The lock collar 194, which is formed as an integral part of the drive sprocket 193, is provided with a plurality of threaded apertures 198 each of which is adapted to receive a lock screw 200 such that when the first end portion 166 of the axle is positioned through the lock collar 194 and the drive sprocket 193, the lock screws 200 can be threadably advanced to engage the first end portion 166 of the packer axle 160 and thereby secure the packer casing 162 to the packer axle 160. Similarly, the lock collar 196 is provided with a plurality of threaded apertures 202 each of which is adapted to receive a lock screw 204 such that when the opposed second end portion 170 of the packer axle 160 is disposed through the lock collar 196 the lock screws 204 can be threadably advanced to engage the opposed second end portion 170 of the axle 160 and secure the packer casing 162 to the packer axle 160.

To ensure that the tires 164 are stabilized on the packer casing 162, and to substantially reduce or eliminate slippage of the tires 164 as the packer assembly 22 rollingly engages the surface of the ground, a plurality of spatially disposed rod members are secured to an outer surface 206 of the packer casing 162 by any suitable means, such as welding. The number of rods employed can vary but desirable results have been obtained wherein four rods are secured to the outer surface 206 of the packer casing 162 so as to be equally spaced one from the other.

Two rod members 208 and 210, are illustrated in FIG. 9; and a rod member 211 is illustrated in FIG. 8. The rod members are identical in construction and function. Thus, only the rod members 208 and 210 will be discussed in detail hereinafter. The rod member 208 is an elongated member having a first end 211 and an opposed second end 212; and the rod member 210 is also an elongated member having a first end 213 and an opposed second end 214. Each of the rod members 208 and 210 have a length less than the length of the packer casing 162 and are secured to the outer surface 206 of the packer casing 162 so as to be disposed substantially parallel to the elongated central axis of the packer casing 162. Since the rod members 208 and 210 have a length less than the packer casing 162, the first ends 211 and 213 of the rod members 208, 210, respectively, terminate a distance from the first end 176 of the packer casing 162; and the second ends 212 and 214 of the rod members 208 and 210, respectively, terminate a distance from the second end 180 of the packer casing 162.

A substantially rectangularly shaped head portion 215 of a bolt 216 is connected to the first end 211 of the rod member 208 and to the outer surface 206 of the packer casing 162 by any suitable means, such as welding, so that a threaded end portion 217 of the bolt 216 is spatially disposed relative to the outer surface 206 and forms an extension member for the first end 211 of the rod member 208 substantially as shown in FIG. 9. Similarly, a substantially rectangularly shaped head portion 218 of a bolt 219 is connected to the first end 213 of the rod member 210 and to the outer surface 206 of the packer casing 162 by any suitable means, such as welding, so that a threaded end portion 220 of the bolt 219 is spatially disposed relative to the outer surface 206 of the pack casing 162 and provides an extension for the first end 213 of the rod member 210.

A substantially rectangularly shaped head portion 221 of a bolt 222 is connected to the second end 212 of the rod member 208 and to the outer surface 206 of the packer casing 162 by any suitable means, such as welding, so that a threaded end portion 223 of the bolt 222 is spatially disposed relative to the outer surface 206 and forms an extension member for the second end 214 of the rod member 210. Similarly, a substantially rectangularly shaped head portion 224 of a bolt 225 is connected to the second end 214 of the rod member 210 and to the outer surface 206 of the packer casing 162 by any suitable means, such as welding so that a threaded end portion 226 of the bolt 225 is spatially disposed relative to the outer surface 206 of the packer casing 162 and provides an extension for the second end 214 of the rod member 210 substantially as shown in FIG. 9.

The tires 164 are positioned on the rod members, such as the rod members 208, 210, so that the rim engaging portion or bead portion of the tires frictionally engage the rod members and thereby stabilize the tires 164 on the packer casing 162. The unique construction of the packer casing 162 and the spatially disposed rod members, such as the rod members 208, 210, in combination with the hollow, non-inflated condition of the tires 164, provided the packer assembly 22 with a floatingtype ride as it moves across the ground thus ensuring that the soil is firmly packed around the seeds, while at the same time, depending on how rough the seed bed is, provides a sufficient floating action so that the seeds are planted to the desired depth.

To further stabilize the tires 164 on the packer casing 162, the packer assembly 22 further comprises a first tire stabilization member 230 and a second tire stabilization member 232. The first tire stabilization member 230 is provided with a tire side wall engaging portion 234 and a centrally disposed packer casing receiving bore 236. The tire engaging portion 234 is provided with a plurality of spatially disposed apertures therein, such as apertures 238, 240, so that when the first tire stabilization member 230 is positioned on the first end 176 of the packer casing 162 the apertures 238, 240 each receive one of the threaded end portions of the bolts secured to the rod members, such as the threaded end portions 217 and 220 of the bolts 216 and 219 secured to the first ends 211 and 213 of the rod members 210, 212, and the tire side wall engaging portion 234 abuttingly engages a side wall of the adjacently disposed tire 164.

Similarly, the second tire stabilization member 232 is provided with a tire engaging portion 242 and a packer casing receiving bore 244. The tire engaging portion 242 is provided with a plurality of spatially disposed apertures therein, such as apertures 246, 248, so that when the second tire stabilization member is positioned on the second end 180 of the packer casing 162 the apertures 246, 248 each receive one of the threaded end portions of the bolts secured to the rod members, such as the threaded end portions 223 and 226 of the bolts 222 and 225 secured to the second ends 212 and 214 of the rod members 208, 210, and the tire engaging portion 242 abuttingly engages a side wall of the adjacently disposed tire 164. The first and second stabilization members 230, 232 can be secured on the packer casing 162 by threadably positioning nuts on the threaded end portions of each of the bolts, such as nuts 249.

Figure 10:
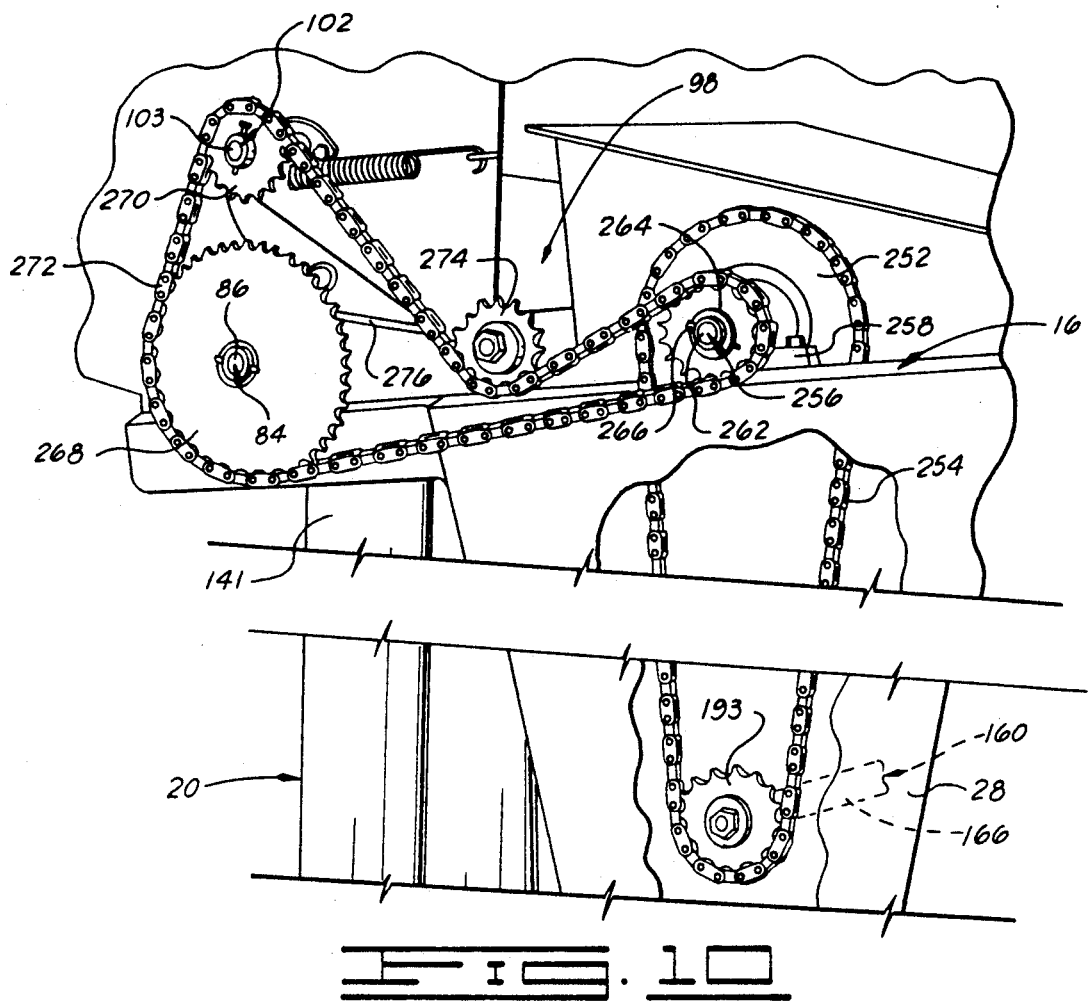
FIG. 10 is a pictorial view of a drive mechanism of the grass seeding implement of FIG. 1 for imparting rotational movement to the directional flow adjustor assembly and the packer wheel assembly in response to rotation of the packer assembly as the implement travels across the ground.
Figure 11:
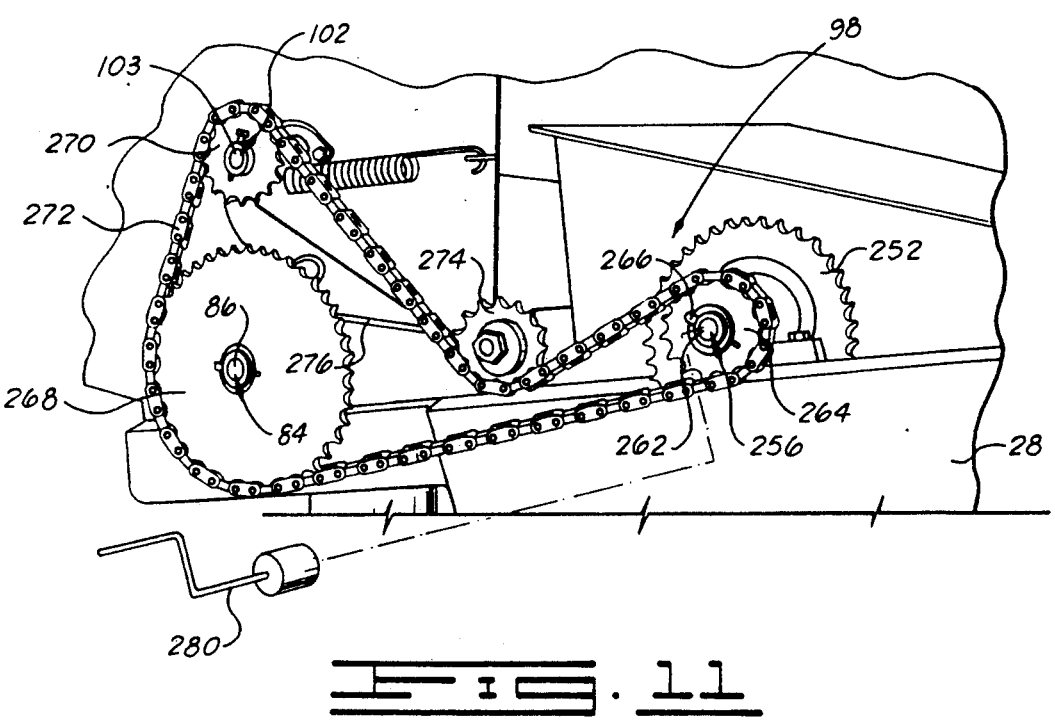
FIG. 11 is a pictorial representation of the picker wheel assembly having a wrench member connectable thereto for calibrating the flow rate of seed dispensed from the seed box of the implement of FIG. 1.

Referring now to FIG. 10, the drive mechanism 98 for interconnecting the packer axle 160, the agitator shaft 102 and the picker wheel axle 84 is illustrated. The drive mechanism 98 comprises the drive sprocket 193, a driven sprocket 252, and a chain 254. The drive sprocket 193 is secured on the first end portion 166 of the packer axle 160 via the lock collar 194 which is disposed on the packer axle 160 so as to abuttingly engages the first end cap member 182. The driven sprocket 252 is rotatably supported on a shaft 256 by the frame assembly 16 such that the driven sprocket 252 is disposed above and aligned with the drive sprocket 193. The shaft 256 is supported by a plurality of pillow blocks, such as pillow blocks 258, and the distal end portion 262 of the shaft 256 is adapted to receive a transfer sprocket 264 substantially as shown.

In order to change the flow rate of seed discharged from the seed box 18, the transfer sprocket 264 is provided with a pin mechanism 266 which can be easily and quickly removed so that different sized sprockets can be employed to replace the transfer sprocket 264. That is, by changing the size of the transfer sprocket 264 one can easily and conveniently change the flow rate of seed discharged from the seed box 18 of the implement 10. Also by being able to change sprockets on the shaft 256 many more possible picker wheel speeds are possible.

A picker wheel sprocket 268 is secured to the first end portion 86 of the picker wheel axle 84; and a directional flow agitator sprocket 270 is connected to the first end portion 103 of the agitator shaft 102. The transfer sprocket 264, the picker wheel sprocket 268 and the directional flow agitator sprocket 270 are interconnected via chain 272 such that when the drive sprocket 193 is rotated due to rotation of the packer axle 160, the chain 254 imparts rotational movement to the driven sprocket 252 which in turn imparts the desired rotational movement to each of the picker wheel sprocket 268 and the directional flow agitator sprocket 270 via the interconnection of such sprockets with the transfer sprocket 264 and the chain 272.

To maintain the proper tension on the chain 272, the drive mechanism 98 further includes a tension sprocket 274. The tension sprocket 274 is connected to a distal end of a spring-biased support arm 276 which is pivotally connected to the frame assembly 16. The pivotal attachment of the springbiased support arm 276 permits the tension sprocket 274 to engage the chain 272 to ensure that proper tension is maintained on the chain 272 at all times, regardless of the dimensions of the transfer sprocket 264.

In order to ensure that the operator of the implement 10 is not inadvertently exposed to the drive mechanism 98, and to ensure that the operator's clothing does not become caught in the drive mechanism 98, the implement 10 is further provided with a drive mechanism cover 278 (FIG. 8). The drive mechanism cover 278 is pivotally connected to the first end wall 48 of the seed box 18 and is constructed such that the drive mechanism cover 278 is biased in a closed position relative to the first end wall 48 of the seed box 18, the frame assembly 16 and the drive mechanism 98. To secure the drive mechanism cover 278 in the closed position, the implement 10 is further provided with a cover latch (not shown) for securing the drive mechanism cover in the closed position.

Heretofore the calibration of grass seeding apparatus and drills has been achieved by a trial-by-error method. That is, one would need to plant a predetermined number of acres to determine if the seed was being discharged by the apparatus at a desired rate. The unique design and interconnection of the drive mechanism 98, the directional flow agitator assembly 40, the picker wheel assembly 76 and the seed delivery tubes 20 enables one to easily and accurately calibrate the implement 10. The method of calibration of the implement 10 will now be described with reference to FIG. 11.

In calibrating the implement 10, the chain 254 is removed from the drive sprocket 193 and the driven sprocket 252. Grass seed is placed in at least one of the compartments of the seed box 18 and containers (not shown) are positioned below the seed delivery tubes 20 communicating with the seed compartment containing the seed. A wrench 280 is positioned on shaft 256. The wrench is turned a predetermined number of turns, such as eight turns. The turning of the shaft 256 results in the rotation of the directional flow agitator assembly 40 and the picker wheel of the picker wheel assembly 76 because of the interconnection of the shaft 256, the picker wheel sprocket 268 and the directional flow agitator sprocket 270 via the chain 272. The rotational movement of the picker wheel sprocket 268 results in the rotation of the picker wheel axle 84 and the picker wheels supported thereon so that seed is discharged from the seed compartment and collected in the containers. The collected seed is weighed, and the average amount of seed discharged through each of the seed delivery tubes 20 is determined.

With the knowledge of the diameter of the tires 164, together with the knowledge as to the analysis of the seed and the number of seed delivery tubes 20 of the implement 10, one can calculate the seed flow rate of seed which will be discharged from the seed box 18 as the implement 10 is moved across the surface of the ground. It should be understood that the flow rate of the seed can be easily varied by changing the transfer sprocket 264 and the sprocket 268 which results in an adjustment in the flow rate of the seed discharged from the seed box 18. Experiments have indicated that once the calibration of the implement 10 has been completed, the seed discharged from the seed box 18 during planting operations will be within 15 percent of the desired flow rate determined by the before described method of calibration.

The unique design of the implement 10 permits one to substantially uniformly plant "fluffy" grass seeds, and at the same time firmly pack the soil around the seed so that the seed is planted at a desired depth of from zero to one-half inch. In addition, because of the unique construction of the directional flow agitator assembly 40, the seed subcompartments 64, 66 and 68, and the picker wheel assembly 76 bridging of grass seed in the seed box 18 is substantially eliminated so that the seed can be uniformly discharged from the seed box 18. Lastly, the unique configuration of the drive mechanism 98, in combination with the directional flow agitator assembly 40, the picker wheel assembly 76 and the packer assembly 22 enables one to efficiently and effectively calibrate the seed discharge rate of the implement 10 to enhance uniform planting of grass seed.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. An implement for seeding grass comprising:
   a frame assembly having a forwardly extending end portion connectable to a towing vehicle;
   a seed box supported on the frame assembly, the seed box defining a plurality of seed compartments, each of the seed compartments having a seed dispensing slot in a lower portion thereof;
   seed delivery tubes connected to the seed box such that each of the seed delivery tubes encompasses one seed dispensing slot;
   picker wheel means rotatably supported in the seed dispensing slots for selectively removing seed from each of the seed compartments;
   directional flow agitator means rotatably mounted in the seed box for agitating and directing seed toward the seed dispensing slots and into contact with the picker wheel means;

packer means rotatably connected to the frame assembly for supporting the frame assembly and for firming soil over and around seed dispensed from the seed compartments through the seed delivery tubes, the packer means having a substantial resilient ground engaging portion disposed rearward of the seed delivery tubes so as to provide the packer means with a floating type motion as same firms the soil over the seeds thereby insuring that the seeds are substantially uniformly planted to a desired depth regardless of minor variations in soil elevation, the packer means comprising:

a packer axle rotatably connected to the frame assembly such that the packer axle is disposed in a substantially perpendicularly, spatial relationship with the seed delivery tubes;

a cylindrically shaped packer casing supported by the packer axle, the cylindrically shaped packer casing having a first end, an opposed second end and an outer surface;

a plurality of tires having hollow, non-inflated interior portions disposed on the packer casing; and means for securing the tires on the packer casing comprising:

a plurality of spatially disposed rod members secured to the outer surface of the packer casing so as to be substantially parallel to the elongated central axis of the packer casing, each of the rod members having a first end and an opposed second end, each of the rod members having a length less than the length of the packer casing;

rod extension members connected to the first and second ends of each of the rod members such that the extension members are spatially disposed relative to the packer casing;

a first tire stabilization member having a centrally disposed packer casing receiving bore and a tire side wall engaging portion disposed about the packer casing receiving bore, the tire side wall engaging portion having a plurality of spatially disposed apertures therein such that when the first tire stabilization member is slidably positioned on the first end of the packer casing each of the apertures in the tire side wall engaging portion receives the extension member connected to the first end of one of the rod members and the tire side wall engaging portion abuttingly engages a side wall of an adjacently disposed tire;

a second tire stabilization member having a centrally disposed packer casing receiving bore and a tire side wall engaging portion disposed about the casing receiving bore, the tire side wall engaging portion having a plurality of spatially disposed apertures therein such that when the second tire stabilization member is slidably positioned on the opposed second end of the packer casing each of the apertures in the tire side wall engaging portion receives the extension member connected to the second end of one of the rod members and the tire side will engaging portion abuttingly engages a side wall of an adjacently disposed tire; and connector means for connecting the first and second tire stabilization members to the extension members; and drive means for operably connecting the packer means to the directional flow agitator means and to the picker wheel means such that when the packer means is rotated rotational movement is imparted to the directional flow agitator means and to the picker wheel means and seed is uniformly discharged from the seed compartments via the seed dispensing slots and the picker wheel means into the seed delivery tubes.

2. The implement of claim 1 wherein the packer means further comprises:

a first end cap member connected to the first end of the packer casing, the first end cap member having a centrally disposed bore extending therethrough for receiving one end portion of the packer axle; and a second end cap member connected to the second end of the packer casing, the second end cap member having a centrally disposed bore extending therethrough for receiving an opposed end portion of the packer axle.

3. The implement of claim 2 wherein the packer axle is characterized as having a medial portion and wherein the packer means further comprises:

a disc member having a centrally disposed bore for receiving a medial portion of the packer axle, the disc member positionable within a central portion of the packer casing so as to reinforce the packer casing and stabilize the medial portion of the packer casing.

4. The implement of claim 3 wherein the packer axle is further characterized as having a first end portion and an opposed second end portion, the frame assembly is provided with a pair of substantially parallel, spatially disposed axle support members, and wherein the implement further comprises:

first flange bearing means for rotatably connecting the first end portion of the packer axle to one of the axle support members; and second flange bearing means for rotatably connecting the second end portion of the packer axle to the other of the axle support members.

5. The implement of claim 4 further comprising:

lock collar means secured to the first and second end portions of the packer axle for abuttingly engaging the first and second end cap members of the packer means and thereby stabilize the packer casing on the packer axle.

6. The implement of claim 1 wherein the seed compartments of the seed box are each provided with at least one lower seed subcompartment having a substantially inverted frusto-pyramidal configuration, the seed box is provided with opposed end walls, and wherein the directional flow agitator means comprises:

an agitator shaft rotatably journaled in the opposed end walls of the seed box; and a plurality of spatially disposed, substantially V-shaped agitators supported on the agitator shaft such that the agitators extend radially therefrom, each of the V-shaped agitators skewed relative to the elongated axis of the agitator shaft such that a plane formed by the V-shaped agitators intersects the elongated axis of the agitator shaft at an acute angle.

7. An implement for seeding grass comprising:

a frame assembly having a forwardly extending end portion connectable to a towing vehicle;

a seed box supported on the frame assembly, the seed box having opposed end walls and defining a plurality of seed compartments, each of the seed compartments provided with at least one lower seed compartment having a substantially inverted frusto-pyramidal configuration, each of the lower seed compartments having a seed dispensing slot in a lower portion thereof;

seed delivery tubes connected to the seed box such that each of the seed delivery tubes encompasses one seed dispensing slot;

picker wheel means rotatably supported in the seed dispensing slots for selectively removing seed from each of the seed compartments;

directional flow agitator means rotatably mounted in the seed box for agitating and directing seed toward the seed dispensing slots and into contact with the picker wheel means, the directional flow agitator means comprising:

an agitator shaft rotatably journaled in the opposed end walls of the seed box;

a plurality of spatially disposed, substantially V shaped agitators supported on the agitator shaft such that the agitators extend radially therefrom, each of the V-shaped agitators skewed relative to the elongated axis of the agitator shaft such that a plane formed by the V-shaped agitators intersects the elongated axis of the agitator shaft at an acute angle; and a plurality of collar members positioned along the agitator shaft such that one of the collar members is positioned in each of the seed compartments above the seed dispensing slot, the V-shaped agitators supported by the collar members such that each collar member is provided with two inner disposed V-shaped agitators and two outer disposed V-shaped agitators, the two inner disposed V-shaped agitators extending from the collar member in opposite direction such that planes formed by leg components of each of the inner disposed V-shaped agitators are parallel and in a spatial relationship, the two outer disposed V-shaped agitators extending from the collar member in opposite direction such that planes formed by leg components of each of the outer disposed V-shaped agitators are parallel and in a spatial relationship;

packer means rotatably connected to the frame assembly for supporting the frame assembly and for firming soil over and around seed dispensed from the seed compartments through the seed delivery tubes, the packer means having a substantial resilient ground engaging portion disposed rearward of the seed delivery tubes so as to provide the packer means with a floating type motion as same firms the soil over the seeds thereby insuring that the seeds are substantially uniformly planted to a desired depth regardless of minor variations in soil elevation, the packer means comprising:

a packer axle rotatably connected to the frame assembly such that the packer axle is disposed in a substantially parallel, spatial relationship with the seed delivery tubes;

a cylindrically shaped packer casing supported by the packer axle, the packer casing characterized as having a first end, an opposed second end and an outer surface;

a plurality of tires having hollow, non-inflated interior portions disposed on the packer casing; and means for securing the tires on the packer casing comprising:

a plurality of spatially disposed rod members secured to the outer surface of the packer casing so as to be substantially parallel to the elongated central axis of the packer casing, each of the rod members having a first end and an opposed second end, each of the rod members having a length less than the length of the packer casing;

rod extension members connected to the first and second ends of each of the rod members such that the extension members are spatially disposed relative to the packer casing;

a first tire stabilization member having a centrally disposed packer casing receiving bore and a tire side wall engaging portion disposed about the packer casing receiving bore, the tire side wall engaging portion having a plurality of spatially disposed apertures therein such that when the first tire stabilization member is slidably positioned on the first end of the packer casing each of the apertures in the tire side wall engaging portion receives the extension member connected to the first end of one of the rod members and the tire side wall engaging portion abuttingly engages a side wall of an adjacently disposed tire;

a second tire stabilization member having a centrally disposed packer casing receiving bore and a tire side wall engaging portion disposed about the casing receiving bore, the tire side wall engaging portion having a plurality of spatially disposed aperture therein such that when the second tire stabilization member is slidably positioned on the opposed second end of the packer casing each of the apertures in the tire side wall engaging portion receives the extension member connected to the second end of one of the rod members and the tire side wall engaging portion abuttingly engages a side wall of an adjacently disposed tire; and connector means for connecting the first and second tire stabilization members to the extension members; and drive means for operably connecting the packer mean to the directional flow agitator means and to the picker wheel means such that when the packer means is rotated rotational movement is imparted to the directional flow agitator means and to the picker wheel means and seed is uniformly discharged from the seed compartments via the seed dispensing slots and the picker wheel means into the seed delivery tubes.

8. The implement of claim 7 wherein the picker wheel means comprises:

a picker wheel axle rotatably supported by the frame assembly such that the picker wheel axle is disposed below the seed box; and a plurality of picker wheels mounted on the picker wheel axle such that one of the picker wheels extends upwardly into each of the seed dispensing slots of the seed box.

9. The implement of claim 8 wherein the drive means comprises:
- a drive sprocket mounted on the packer axle;
- a shaft member rotatably mounted on the frame assembly so as to be aligned with the packer axle;
- a driven sprocket mounted on the shaft member so as to be vertically aligned with the drive sprocket;
- first chain means disposed about the drive sprocket and the driven sprocket for connecting same and for imparting rotational movement to the driven sprocket and the shaft member in response to rotational movement of the packer axle and the drive sprocket;
- a transfer sprocket mounted on the shaft member so as to be spatially disposed relative to the driven sprocket;
- a picker wheel sprocket mounted on the picker wheel axle so as to be aligned with the transfer sprocket;
- a directional flow agitator sprocket mounted on the agitator shaft so as to be aligned with the transfer sprocket and the picker wheel sprocket; and
- second chain means disposed about the transfer sprocket, the picker wheel sprocket and the directional flow agitator sprocket for imparting rotational movement to the picker wheel sprocket and the directional flow sprocket, and thus the picker wheels and the substantially V-shaped agitators, in response to rotational movement of the transfer sprocket.

10. The implement of claim 9 wherein the drive means further comprises:
- a spring-biased support arm pivotal connected to the frame assembly, the support arm having a distal end portion; and
- a tension sprocket rotatably mounted on the distal end portion of the support arm so as to engage the second chain means and provide tension on the second chain means.

11. The implement of claim 10 further comprising:
- wrench means connectable to the shaft member for selectively rotating the shaft member in order to calibrate the seed dispensing rate of the implement when the first chain means is disconnected from the drive sprocket and the driven sprocket.

* * * * *

UNITED STATES PATENT AND TRADEMARK OFFICE
CERTIFICATE OF CORRECTION

PATENT NO. : 5,035,190

DATED : July 30, 1991

INVENTOR(S) : Charles I. Grimes

It is certified that error appears in the above-identified patent and that said Letters Patent is hereby corrected as shown below:

Title page, References Cited, U.S. PATENT DOCUMENTS,
        delete "4,030,428   6/1977   Trua...... 11/177 X"
        and substitute therefor:
        --4,030,428   6/1977   Truax........... 11/177 X--;

Title page, References Cited, FOREIGN PATENT DOCUMENTS,
        delete "5871   8/1903   German Democratic
                                    Rep. ............... 222/238"
        and substitute therefor:
        --5871   8/1903   Denmark................. 222/238--;

Column 1, line 19, delete "rang" and substitute therefor --range--;

Column 3, line 6, delete "plane" and substitute therefor --planes--;

Column 3, line 31, delete "ca" and substitute therefor --can--;

Column 5, line 2, after "fabricated" delete "o" and substitute therefor --of--;

Column 5, line 24, after "substantially" delete "a" and substitute therefor --as--;

Column 7, line 16, after "so" delete "a" and substitute therefor --as--;

UNITED STATES PATENT AND TRADEMARK OFFICE
CERTIFICATE OF CORRECTION

PATENT NO. : 5,035,190

DATED : July 30, 1991

INVENTOR(S) : Charles I. Grimes

It is certified that error appears in the above-identified patent and that said Letters Patent is hereby corrected as shown below:

Column 7, line 33, after "FIGS." insert --4--;

Column 8, line 21, delete "08" and substitute therefor --108--;

Column 8, line 22, delete "normaly" and substitute therefor --normally--;

Column 10, line 52, delete "no" and substitute therefor --not--;

Column 12, line 11, delete "floatingtype" and substitute therefor --floating-type--;

Column 13, line 28, delete "springbiased" and substitute therefor --spring-biased--; and Column 15, line 67 (claim 1), delete "will".

Signed and Sealed this

Third Day of November, 1992

*Attest:*

DOUGLAS B. COMER

*Attesting Officer*     *Acting Commissioner of Patents and Trademarks*